United States Patent [19]
Ecclesine

[11] Patent Number: 5,797,037
[45] Date of Patent: Aug. 18, 1998

[54] INTERRUPT REQUEST CONTROL LOGIC REDUCING THE NUMBER OF INTERRUPTS REQUIRED FOR I/O DATA TRANSFER

[75] Inventor: Peter Ecclesine, Livermore, Calif.

[73] Assignee: Cirrus Logic, Inc., Fremont, Calif.

[21] Appl. No.: 414,474

[22] Filed: Mar. 31, 1995

[51] Int. Cl.⁶ ............................. G06F 13/14; G06F 9/46
[52] U.S. Cl. ...................... 395/868; 395/848; 395/739
[58] Field of Search ............................ 395/868, 842, 395/848, 733, 739, 735

[56] References Cited

U.S. PATENT DOCUMENTS

| | | |
|---|---|---|
| 5,291,608 | 3/1994 | Flurry ............................. 395/725 |
| 5,367,689 | 11/1994 | Mayer et al. ..................... 395/725 |
| 5,459,870 | 10/1995 | Iwasa et al. ...................... 395/734 |
| 5,484,726 | 1/1996 | Kumaki et al. ................ 395/200.01 |
| 5,530,874 | 6/1996 | Emery et al. ..................... 395/735 |

*Primary Examiner*—Thomas C. Lee
*Assistant Examiner*—Rehana Perveen
*Attorney, Agent, or Firm*—Lowe, Price LeBlanc & Becker; Frank D. Nguyen

[57] ABSTRACT

A DMA data transfer system is provided with an interrupt request controller that has pass through logic, data limit logic, stale data logic and error detecting logic to monitor for predetermined conditions. A request for an interrupt sent to a central processor is generated by the interrupt request controller when an input interrupt request is applied to the interrupt request controller and one of the following conditions is met: 1) no previous DMA requests had occurred for a predetermined time interval; 2) a preset limit for the amount of data being transferred is reached; 3) no new requests for DMA transfer occur for preset time intervals; or 4) the status indicates an error in the data being transferred, or priority handling of the data is requested. By making sure one of the predetermined conditions is met before generating an interrupt request, the number of interrupt requests to the central processing unit is greatly reduced and the throughput of the system is increased.

22 Claims, 8 Drawing Sheets

INTERRUPT REQUEST CONTROL LOGIC REDUCING THE NUMBER OF INTERRUPTS REQUIRED FOR I/O DATA TRANSFER

TECHNICAL FIELD

This invention relates to data processing systems, and more particularly, to an interrupt-driven Input/Output (I/O) system using a Direct Memory Access (DMA) data transfer mechanism.

BACKGROUND ART

In a data processing system, data transfers between memory and Input/Output (I/O) devices can be handled either by a central processor in a programmed I/O mode or by a DMA controller in a DMA mode of data transfer. DMA allows the processor to continue to execute instructions from its prefetch queue or cache while transfers are being made between an I/O device and memory. When using DMA to transfer a block of information between an I/O device and memory, the processor must still initiate the block data transfer, but the actual data transfer and its termination are handled solely by the DMA controller. Once a DMA block data transfer has been initiated, the DMA controller and the I/O device do not disturb the processor again until the entire block of data has been transferred. At that time, an interrupt controller generates an interrupt request to the central processor.

The growth in computer applications that require heavy data traffic and the increasing availability of high-speed transmission lines create a need for computer systems able to manage the data traffic at high rates. However, their throughput is limited by the processing power of processors (CPUs). For example, high-speed communication systems may require the processors to be interrupted at rates of 20,000-100,000 interrupts per second. To eliminate processing bottlenecks created by the processors, the number of interrupts should be reduced. In particular, it would be desirable to reduce the number of interrupts associated with DMA data transfers.

SUMMARY OF THE INVENTION

Accordingly, an advantage of the invention is in providing an interrupt-driven data processing system that reduces the number of required interrupts to a central processing unit to provide DMA data transfers.

Another advantage of the invention is in providing a DMA data transfer system that generates interrupts to a central processing unit in response to predetermined conditions.

The above and other advantages of the invention are achieved, at least, in part, by providing an interrupt driven DMA data transfer system that comprises a DMA controller for handling DMA data transfer between a data source and a memory. An I/O controller that interfaces the data source and the memory supplies an interrupt controller with a request to interrupt a central processor upon completion of a DMA data transfer operation. The interrupt controller delays the interrupt request until a predetermined condition is detected.

In accordance with a preferred embodiment of the invention, in response to requests for a DMA transfer of status information and data, the DMA controller provides status and data DMA transfer acknowledgements. The interrupt controller monitors the status and data DMA transfer requests and acknowledgements. Also, the interrupt controller decodes the status information and data transferred via a data bus between the data source and the memory.

In accordance with one aspect of the invention, the interrupt controller generates the interrupt request when no previous DMA requests have occurred for a predetermined time interval.

In accordance with another aspect of the invention, the interrupt controller generates the interrupt request when a preset limit for the amount of data being transferred is reached.

In accordance with a further aspect of the invention, the interrupt request is sent to a central processor when no new requests for a DMA transfer occur for preset time intervals.

In accordance with another aspect of the invention, the interrupt controller interrupts the central processor when the status indicates an error in the data being transferred, or priority handling of the data is requested.

In accordance with the method of this invention, the following steps are carried out. A DMA data transfer operation is performed between a memory and an I/O device. An interrupt request logic is supplied with an input request signal upon completion of the DMA data transfer operation. The input request signal is delayed by the interrupt request logic to generate a interrupt request to a central processor when a predetermined condition is detected.

In accordance with the present invention, an interrupt control logic of the invention delays an interrupt request until a predetermined condition is detected rather than interrupts the processor upon completion of each DMA data transfer, in order to reduce the number of interrupts to the processor. This increases the throughput of a data processing system.

Still other advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

Figure 1:
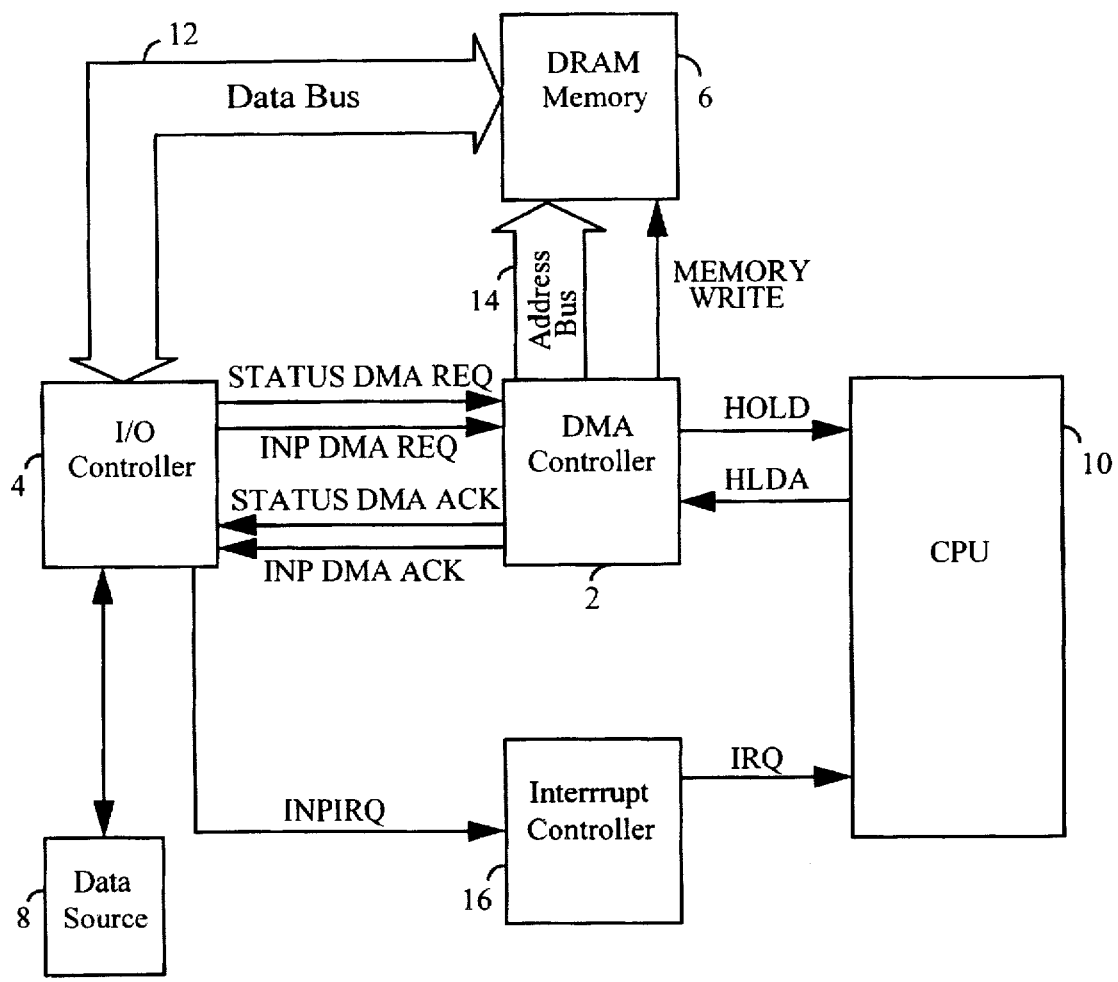
FIG. 1 is an illustrative diagram of a DMA data transfer system.

Although the invention has general applicability in the field of data processing systems, the best mode for practicing the invention is based in part on the realization of a DMA data transfer as provided in the system shown in FIG. 1, wherein a DMA controller 2, provides a number of separate DMA channels to handle data transfers between an I/O device and memory. For example, the DMA controller 2 provides a DMA data transfer between an I/O controller 4 and a dynamic random access memory (DRAM) 6 using DMA channels programmed by a programmer to set up the start memory address, transfer count (number of bytes to be transferred) and the direction of the transfer with reference to the memory.

When the first byte of the data has been transferred from a data source 8 (for example, data channel or storage) to the I/O controller 4, the latter asserts a DMA request signal that is received by the DMA controller 2. In some applications, separate DMA channels are provided for transferring status information and input data. In particular, input data may be accompanied with a data descriptor that indicates the status of the data related events. For example, such a descriptor may be used to report parity and/or system errors. Also, it may describe what to do with the accompanied data or request a specific procedure to be used for handling the accompanied data. In this case, as shown in FIG. 1, the DMA controller 2 is supplied with separate DMA requests for transferring status information (STATUS DMA REQ) and for transferring input data (INP DMA REQ). In response to any one of the DMA requests, the DMA controller 2 asserts a hold request signal (HOLD) to seize address, data and control buses from a central processing unit (CPU) 10. When the CPU 10 completes the current cycle, it asserts HLDA to inform the DMA controller 2 that its request is granted. The DMA controller 2 responds by sending DMA acknowledge for status information and input data (STATUS DMA ACK and INP DMA ACK, respectively) to the I/O controller 4. The I/O controller gates the status information and input data to a data bus 12 to the DRAM memory 6 and drops the DMA requests.

Simultaneously, the DMA controller 2 activates a Memory Write Command Line (MEMORY WRITE) and places the addresses from the start address registers of the corresponding DMA channels onto the address bus 14. As a result, the status information and input data on the data bus 12 are written into the memory at the addresses currently on the address bus 14.

The DMA controller 2 then increments the memory address register of each DMA channel by one to point to the address in the DRAM 6 where it will store the next byte it receives from the I/O controller 4. Also, the DMA controller 2 decrements the byte transfer count.

When the transfer count is exhausted, the data transfer is complete, and the DMA controller 2 deactivates the HOLD signal inform the CPU 10 that it no longer needs the buses. The DMA controller 2 also supplies a Terminal Count (TC) signal to the I/O controller 4 to indicate the end of the process. In response, the I/O controller 4 sends a device-specific input interrupt request (INPIRQ) to an interrupt request controller 16 to generate an interrupt request (IRQ) to the CPU 10.

Figure 2:
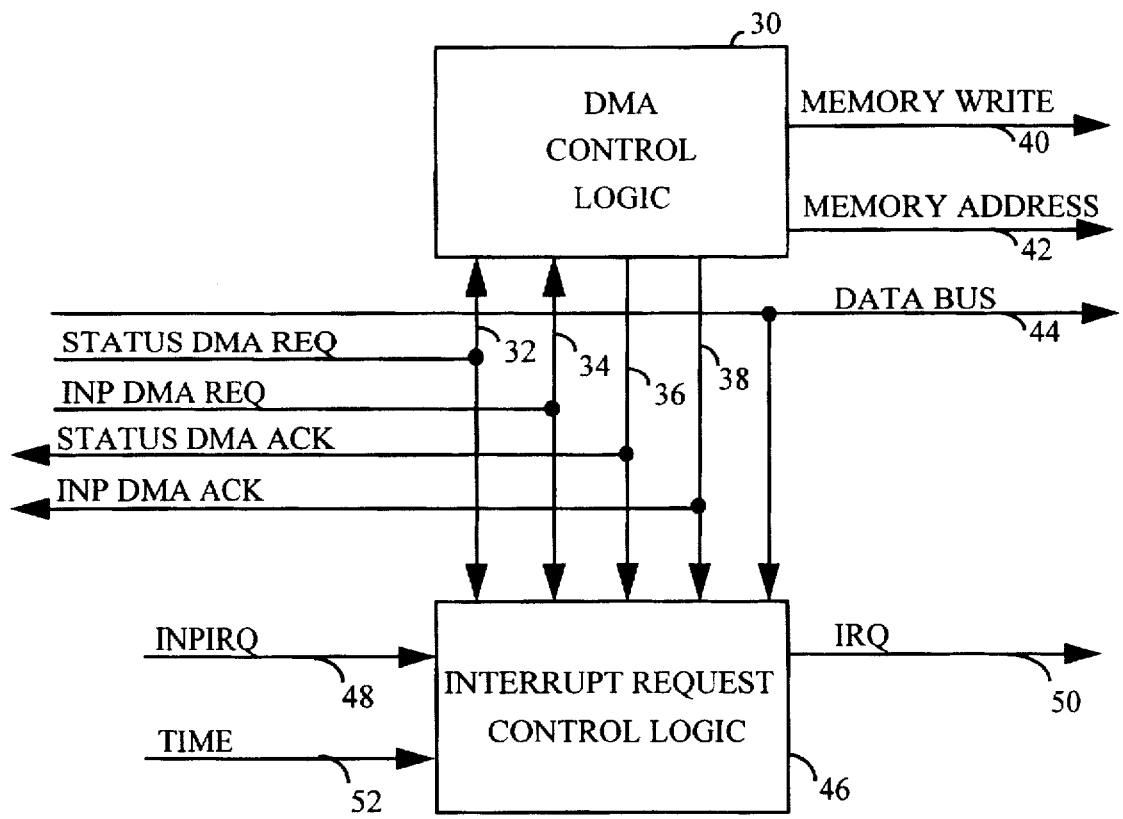
FIG. 2 is a diagram showing an interaction between DMA control logic and interrupt control logic in accordance with the present invention.

Reference is now made to FIG. 2 of the drawings showing a DMA control logic 30 of the present invention that receives DMA requests for transferring status information STATUS DMA REQ (line 32) and for transferring input data INP DMA REQ (line 34), for example, from the I/O controller 4 interacting with the data source 8 in the manner discussed in connection with FIG. 1. The DMA control logic 30 responds with DMA acknowledge signals for status information (STATUS DMA ACK) and input data (INP DMA ACK), asserted on lines 36 and 38, respectively. Also, the DMA control logic 30 activates a MEMORY WRITE line 40 and places the addresses from address registers of corresponding DMA channels onto a MEMORY ADDRESS bus 42. As a result, the status information and input data on a DATA bus 44 are written into the memory 6 at the addresses currently on the MEMORY ADDRESS bus 42.

The lines 32, 34, 36, 38 and DATA bus 44 are coupled to an interrupt request control logic 46 to supply it with the STATUS DMA REQ, INP DMA REQ, STATUS DMA ACK, INP DMA ACK signals, and with the data and status information. In response to an input interrupt request INPIRQ provided via a line 48, for example, from the I/O controller 4, the interrupt request control logic 46 generates an interrupt request IRQ supplied via a line 50 to a CPU 10. The interrupt request control logic 46 is also supplied with a time defining TIME signal (line 52) from a system clock.

Figure 3:
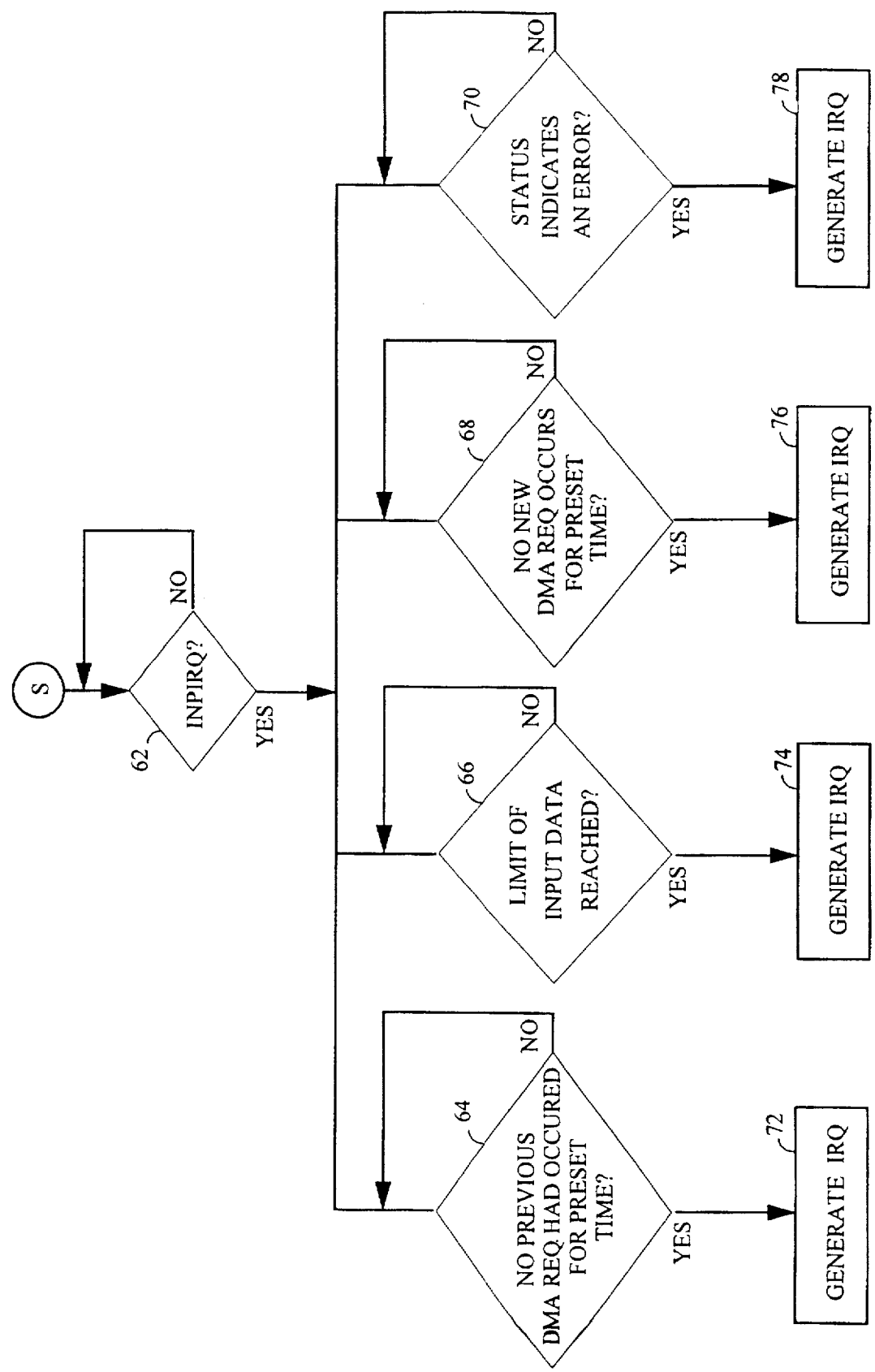
FIG. 3 is a flow-chart illustrating the operation of the interrupt control logic in accordance with the present invention.

To reduce the number of interrupts requested from the CPU 10, the interrupt request control logic 46 of the present invention delays generating the IRQ signal in response to the INPIRQ signal until a predetermined condition is detected. Referring to FIG. 3, the interrupt request logic 46 checks whether or not the INPIRQ signal is asserted (block 62), and if so, it carries out procedures 64, 66, 68 and 70 for detecting one of the predetermined conditions for generating the IRQ signal.

In block 64, the interrupt request control logic 46 checks whether a predetermined time interval has passed after previous STATUS DMA REQ and INP DMA REQ signals were deasserted. If so, the interrupt request control logic 46 considers the DMA data transfer to be stale, and generates the IRQ signal (block 72).

In block 66, the interrupt request control logic 46 checks whether or not a preset limit for the amount of input data is reached. The IRQ signal is generated in block 74 if a predetermined time interval has passed after the INP DMA ACK signal was asserted, or the INP DMA ACK signal is asserted a predetermined number of times.

In block 68, the interrupt request control logic 46 determines whether or not new STATUS DMA REQ and INP DMA REQ occur within predetermined time intervals. If no new DMA requests occur, the logic 46 considers DMA data transfer to be stale and generates the IRQ signal (block 76).

In block 70, the interrupt request control logic 46 decodes data on the DATA bus 44 and checks the status of the data. The IRQ signal is generated in block 78, if the status indicates an error in the decoded data.

Figure 4:
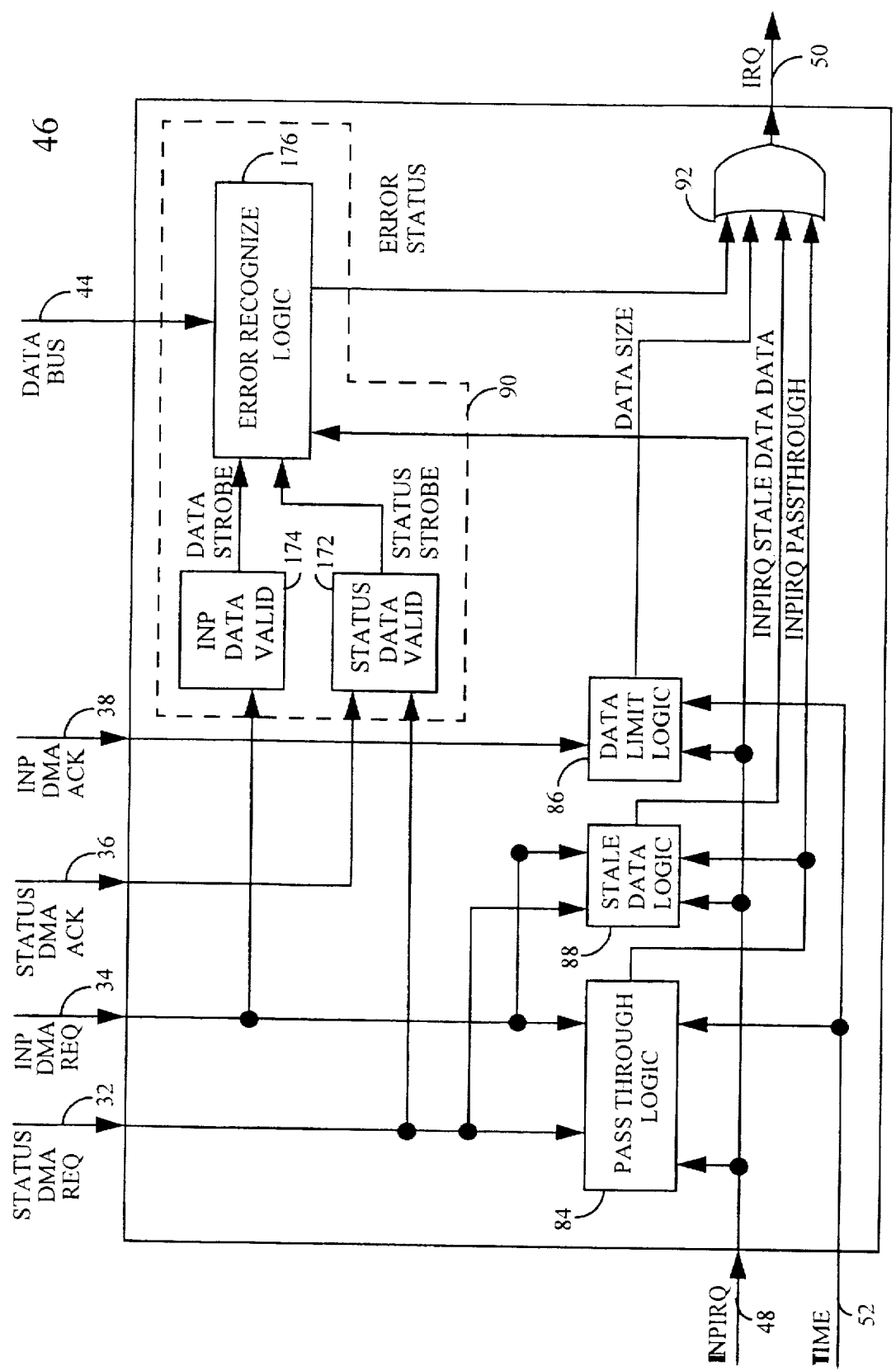
FIG. 4 is a block diagram of the interrupt control logic.

Referring to FIG. 4, the interrupt request control logic 46 comprises pass through logic 84, data limit logic 86, stale data logic 88 and error detecting logic 90 for carrying out the procedures of blocks 64, 66, 68 and 70, respectively. The outputs of the circuits 84, 86, 88 and 90 (INPIRQ PASSTHROUGH, DATA SIZE, INPIRQ STALE DATA and ERROR STATUS, respectively) are supplied to an output OR gate 92 to generate the IRQ signal when any one of the outputs is asserted.

Figure 5:
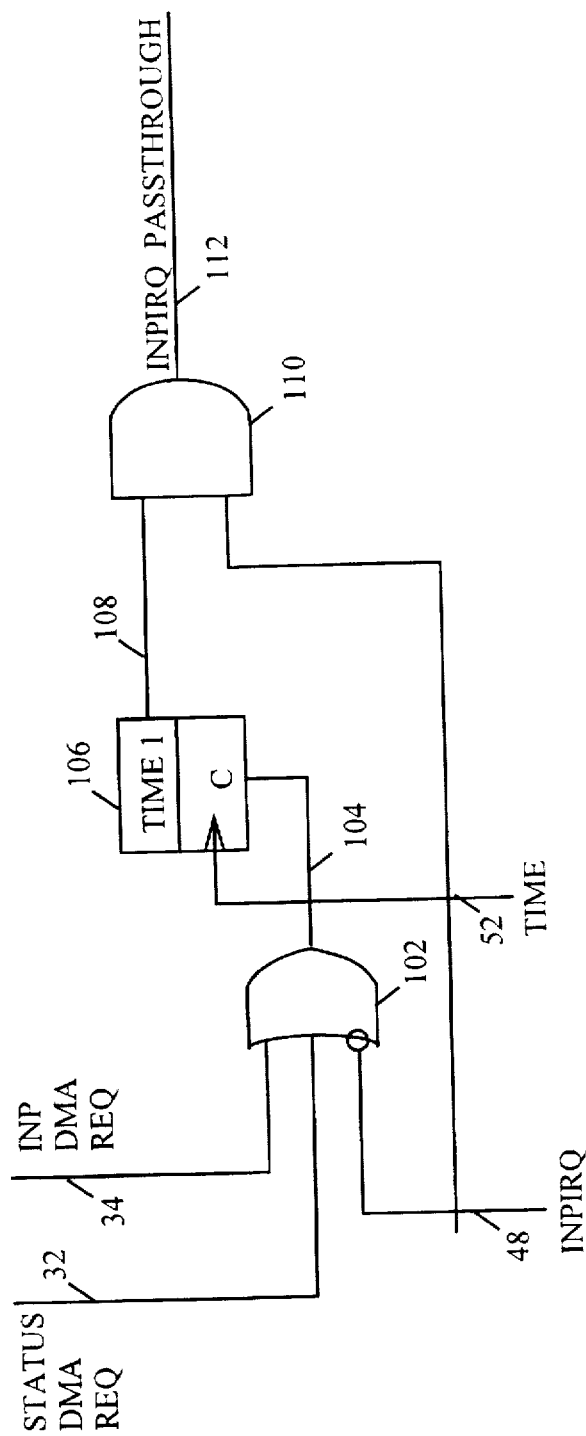
FIG. 5 is a diagram of pass through logic shown in FIG. 4.

As shown in FIG. 5, the pass through logic 84 comprises an OR gate 102 supplied with the STATUS DMA REQ, INP DMA REQ and INPIRQ signals via the lines 32, 34 and 48, respectively. Also, the logic 84 receives the TIME signals via the line 52. The output 104 of the OR gate 102 is TRUE whenever the INP DMA REQ or STATUS DMA REQ is TRUE, or INPIRQ is FALSE.

The output 104 clears a timer 106 incremented on each pulse of the TIME signal. The current value of the timer 106 is compared with a predetermined time limit TIME 1 representing the maximum delay time for generating the interrupt request IRQ in response to the INPIRQ, when no DMA activity is provided. For example, the time limit TIME 1 may be about 30–50 microseconds. The output 108 of the timer 106 is TRUE when its current value is greater than or equal to the time interval TIME 1.

An AND gate 110 is supplied with the output 108 and the INPIRQ signal. The output 112 of the AND gate 110 is TRUE when the output 108 and the INPIRQ are both TRUE. The INPIRQ PASSTHROUGH signal representing the output of the pass through logic 84 is formed at the output 112. Accordingly, the pass through logic 84 measures the time interval since either STATUS DMA REQ or INP DMA REQ was last deasserted, indicating the end of a DMA data transfer. The INPIRQ PASSTHROUGH signal is generated when this time interval is greater than or equal to the time limit TIME 1.

Figure 6:
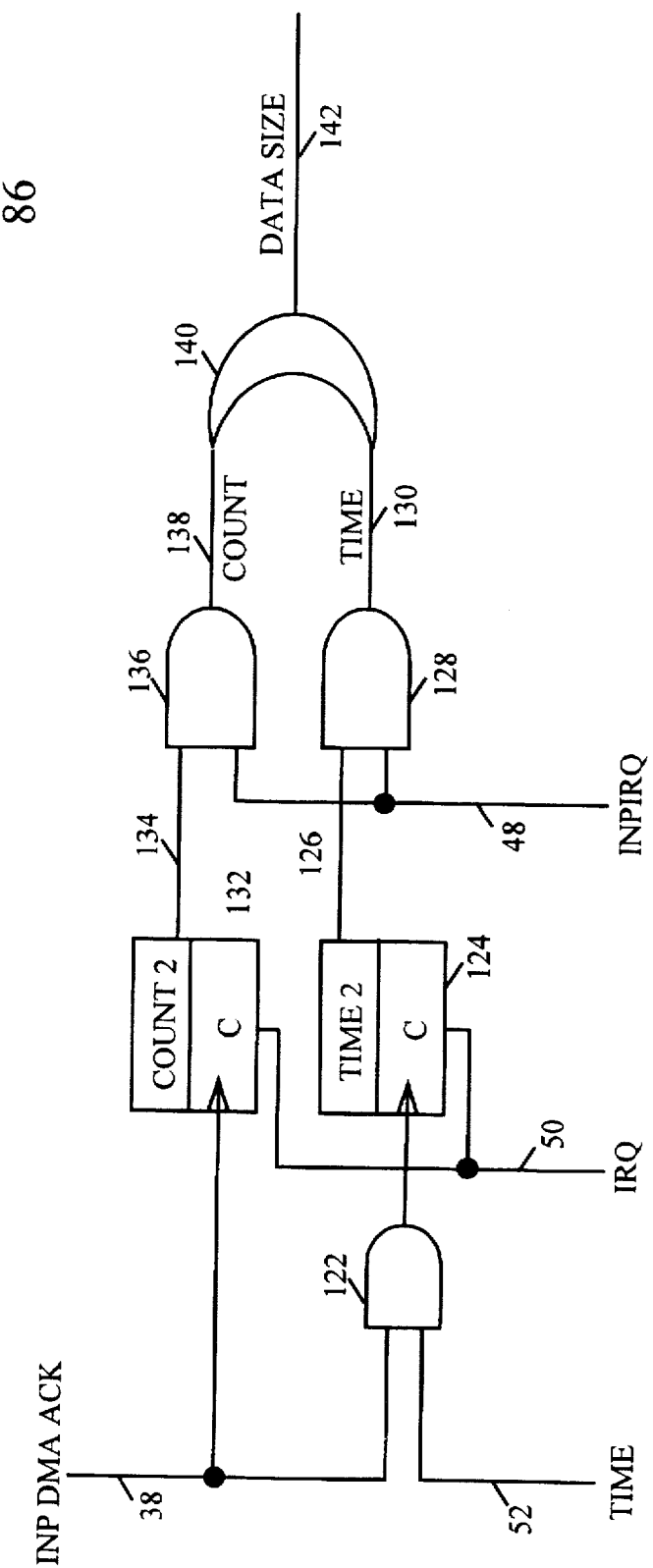
FIG. 6 is a diagram of data limit logic shown in FIG. 4.

Referring to FIG. 6, the data limit logic 86 is supplied with the INP DMA ACK, INPIRQ and TIME signals via the lines 38, 48 and 52, respectively. Also, the IRQ signal is applied via the line 50.

The INP DMA ACK and TIME signals are applied through an AND gate 122 to a timer 124 cleared by the IRQ signal. The timer 124 increments when the INP DMA ACK and TIME signals are both TRUE. A current value of the timer 124 is compared with a predetermined time limit TIME 2. Whenever the current value of the timer 124 is equal to or greater than the time limit TIME 2, an output 126 of the timer 124 is TRUE. The output 126, together with the INPIRQ signal, is applied to an AND gate 128 having its output 130 at a TRUE level, when the output 126 and INPIRQ signal are both TRUE. The timer 124 measures the time interval of DMA data transfer after the IRQ was last deasserted. Accordingly, the output 130 indicates that the amount of data transferred after the last interrupt request is equal to or greater than a preset data limit.

A counter 132 cleared by the IRQ signal counts the number of times the INP DMA ACK has become TRUE. Its current count is compared with a preset limit COUNT 2 to provide a TRUE level at an output 134 when the current count is equal to or greater than the limit COUNT 2. The output 134, together with the INPIRQ signal, is supplied to an AND gate 136 having its output 138 at a TRUE level whenever the output 134 and the INPIRQ signal are both TRUE. The counter 132 determines the total time the INP DMA ACK has been asserted since IRQ was last deasserted. Accordingly, the output 138 indicates that the amount of data transferred after the last interrupt request is equal to or greater than a preset data limit.

When a DMA data transfer runs slowly, the counter 132 may become disabled, however the timer 124 will measure the time of the data transfer. Therefore, the outputs 130 and 138 respectively associated with the timer 124 and counter 132 are supplied to an OR gate 140 having its output 142 at a TRUE level whenever the output 130 of the timer channel or output 138 of the counter channel is TRUE. The signal DATA SIZE formed at the output 142 is provided to the OR gate 92 to generate the IRQ signal.

Figure 7:
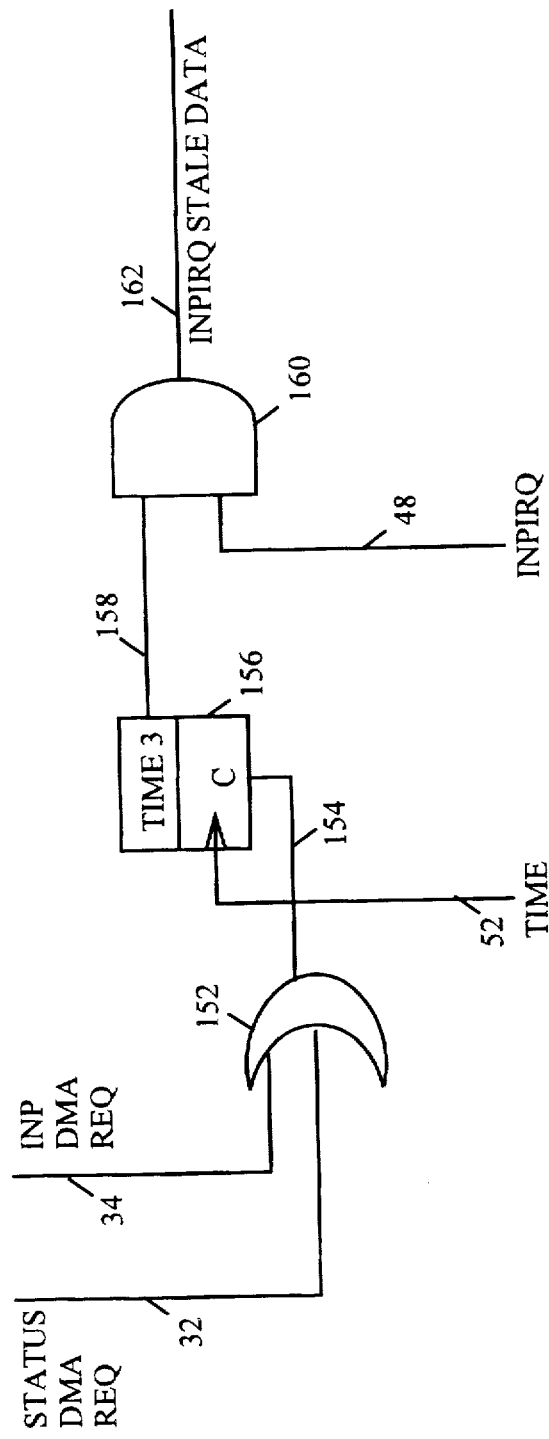
FIG. 7 is a diagram of stale data logic shown in FIG. 4.

Referring to FIG. 7, the stale data logic 88 monitors the STATUS DMA REQ, INP DMA REQ and INPIRQ signals supplied via the lines 32, 34 and 48. Also, the TIME signal is provided via the line 52. An OR gate 152 receives the STATUS DMA REQ and INP DMA REQ signals and forms a TRUE level at its output 154 when at least one of these signals is TRUE. The output 154 clears a timer 156 that increments on each pulse of the TIME signal. Accordingly, the timer 156 measures the time since the INP DMA REQ was last deasserted. A current value of the timer 156 is compared with a predetermined time limit TIME 3 to form a TRUE level at an output 158 when the current value is equal to or greater than the time limit TIME 3. The output 158 and INPIRQ signal are applied to inputs of an AND gate 160 to form a TRUE level at its output 162 when both of these signals are TRUE.

The time limit TIME 3 equal, for example, to 15–25 microseconds is based on the nominal interval between the INP DMA REQ assertions. It is chosen as the maximum time interval to delay generating the IRQ in response to the INPIRQ in the absence of data transferred by the DMA mechanism. After this time interval, the DMA data transfer is considered to be stale. Accordingly, the INPIRQ STALE DATA signal formed at the output 162 and supplied to the OR gate 92 indicates a stale condition of the DMA data transfer.

Referring back to FIG. 4, the error detecting logic 90 comprises a status data validity checking circuit 172 and an input data validity checking circuit 174. The former checks the STATUS DMA REQ and STATUS DMA ACK signals to form a STATUS STROBE signal if the status data are valid. The input data validity checking circuit 174 monitors the INP DMA REQ and INP DMA ACK signals and forms a DATA STROBE signal if the input data are valid. An error recognize logic 176 decodes the status information and data from the data bus 44 and uses the STATUS STROBE and DATA STROBE signals to gate the status and data to be analyzed.

The error recognize logic 176 matches a status coding circuit in the data source. The error encoding rules of the logic 176 are based on the status coding bit assignments and word locations defined by the data source. For example, the error encoding rules that the logic 176 executes can be defined as follows.

All data transfers begin with a status and length. The status defined by specific status coding bit assignments is always the first word of the transfer. The second word of the transfer is always the number of subsequent words to be transferred, unless the status coding indicates that there is no subsequent data. In this case, only the status transfer is carried out.

Figure 8:
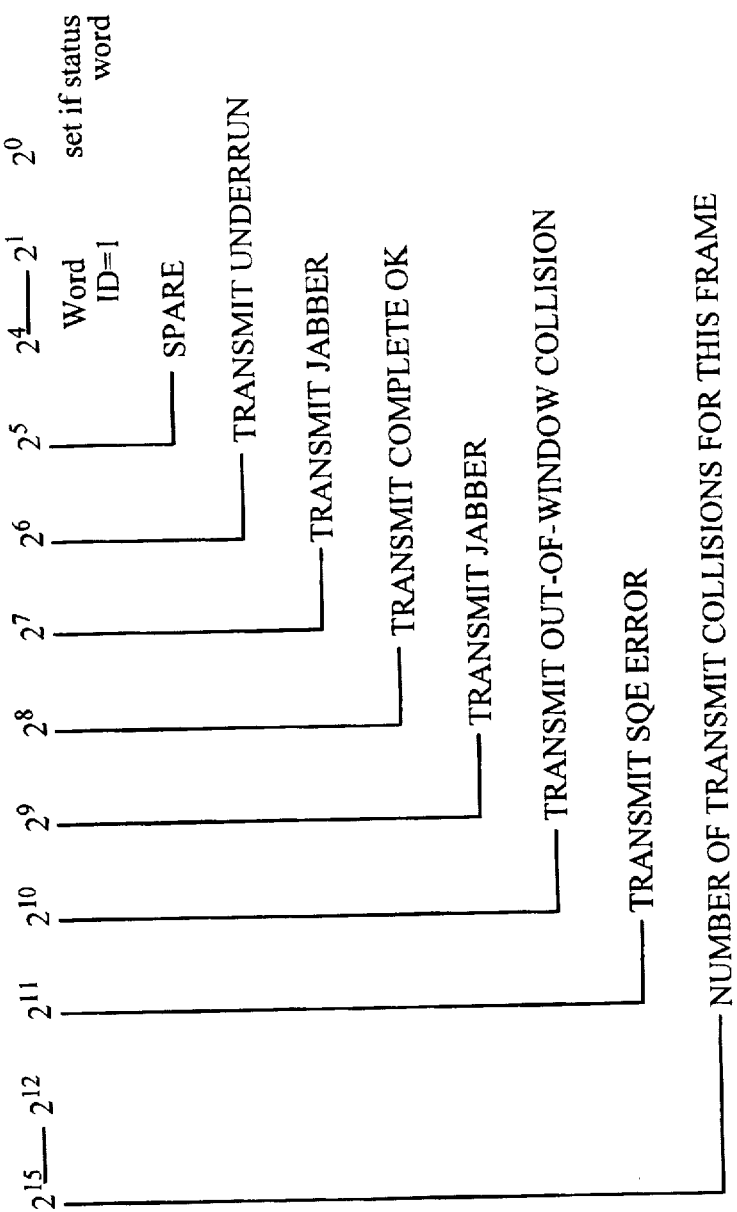
FIG. 8 is an example of status coding bit assignments.

FIG. 8 shows an example of status coding bit assignments for the present invention. In this example, bits 15–12 transmit the number of transmit collisions per frame. Bit 11 indicates a sequential error (SQE). Bit 10 indicates out-of-window collision. Bits 9 and 7 transmit jabber (Ethernet-specific message indicating that the transmission period is greater than the preset value). Bit 8 indicates that the transmission is completed without errors. Bit 6 indicates underrun. Bit 5 is spare. Bits 4–1 transmit a word's identification. Bit 0 is set if the status word is transmitted. In this example, any status word having bits 4–0 set to 00011 and bit 8 not set is considered to be a status word indicating a transmit frame error. Accordingly, the error recognize logic 176 knows the status coding rule of the data source and is able to detect a status word indicating an error. The status information can be transferred using the status DMA request and acknowledgement lines separate from the input data DMA request and acknowledgement lines. Alternatively, the status information can be mixed with the data and transmitted using the same request and acknowledgement lines as the input data. When an error is detected and the INPIRQ signal is asserted, the ERROR STATUS signal is supplied to the OR gate 92 to request an interrupt.

Moreover, the error recognize logic 176 can recognize the data frames that contain an indication of priority or precedence. Such frames cause the output signal of the logic 176 to be supplied to the OR gate 92 to generate the IRQ immediately if the INPIRQ is asserted.

For example, if the logic 176 decodes a data frame on the data bus 44 having byte 13 with value 08, and byte 14 set to 00, it concludes that the data frame is of an Internet Protocol (IP) type. Byte 16 of an IP data frame is defined as a type of service field. Non-zero values of this field denote precedence, low delay, high throughput or high reliability request. In this case, if the logic 176 detects a non-zero value of the byte 16 of the IP data frame, it generates an output signal to request an interrupt when the INPIRQ is asserted. As can be seen from this example, the logic 176 can decode bytes having specified numbers in a frame and compare their values with preset values. Based on this comparison, the logic 176 prescribes the action to be performed in connection with the decoded frame. The interrupt can be requested when one of the following conditions is met:

1) the decoded values match the preset values, 2) the decoded values do not match the preset values, 3) values of any decoded bits match the preset values, or 4) no decoded bits match preset values.

Alternatively, the logic 176 can prescribe to continue DMA data transfer without an interrupt to the CPU, if the above-listed conditions are met.

As discussed above, the OR gate 92 is coupled to the circuits 84, 86, 88 and 90 to generate the IRQ signal, when any one of these circuits provides an output signal.

The present invention thus provides an interrupt request controller for a DMA data transfer system that generates a request for an interrupt IRQ sent to a CPU when an input interrupt request INPIRQ is asserted and one of the following conditions is met:

1) no previous DMA requests had occurred for a predetermined time interval;

2) a preset limit for the amount of data being transferred is reached;

3) no new requests for DMA transfer occur for preset time intervals;

4) the status indicates an error in the data being transferred, or priority handling of the data is requested.

Accordingly, the disclosed interrupt request control system allows the number of central processor interrupts associated with DMA data transfers to be reduced, in order to increase throughput of data processing systems.

In this disclosure, there is shown and described only the preferred embodiment of the invention, but it is to be understood that the invention is capable of changes and modifications within the scope of the inventive concept as expressed herein.

I claim:

1. An interrupt-driven system for DMA data transfer between a data source and a memory comprising:

an input/output (I/O) controller responsive to said data source for interfacing said data source to said memory, a DMA controller responsive to said I/O controller for handling data transfer between said data source and said memory, and an interrupt request control logic responsive to said I/O controller for generating an interrupt request to interrupt a central processing unit (CPU) upon completion of a data transfer operation, wherein said interrupt request control logic delays said interrupt request until a predetermined condition is met.

2. The system of claim 1, wherein said interrupt request control logic comprises a condition detector that determines when a predetermined condition is met.

3. The system of claim 2, wherein said condition detector monitors data being transferred between said data source and said memory.

4. The system of claim 3, wherein said condition detector includes logic for monitoring status information indicating status of said data and generating said interrupt request when said status information indicates an error.

5. The system of claim 3, wherein said DMA controller provides a DMA acknowledgement in response to a DMA request for DMA data transfer.

6. The system of claim 5, wherein said interrupt request control logic is supplied with said DMA request and DMA acknowledgement.

7. An interrupt-driven system for DMA data transfer between a data source and a memory comprising:

an input/output (I/O) controller responsive to said data source for interfacing said data source to said memory, a DMA controller responsive to said I/O controller for handling data transfer between said data source and said memory, and an interrupt request control logic responsive to said I/O controller for generating an interrupt request to interrupt a central processing unit (CPU) upon completion of a data transfer operation, wherein said interrupt request control logic delays said interrupt request until a predetermined condition is met, wherein said interrupt request control logic comprises a condition detector that determines when a predetermined condition is met, wherein said condition detector monitors data being transferred between said data source and said memory, wherein said DMA controller provides a DMA acknowledgement in response to a DMA request for DMA data transfer, wherein said interrupt request control logic is supplied with said DMA request and DMA acknowledgement, and wherein said interrupt request control logic includes logic for determining a time interval after deasserting said DMA request and for generating said interrupt request when no DMA request has occurred for said time interval equal to a first preset value.

8. An interrupt-driven system for DMA data transfer between a data source and a memory comprising:

an input/output (I/O) controller responsive to said data source for interfacing said data source to said memory, a DMA controller responsive to said I/O controller for handling data transfer between said data source and said memory, and an interrupt request control logic responsive to said I/O controller for generating an interrupt request to interrupt a central processing unit (CPU) upon completion of a data transfer operation, wherein said interrupt request control logic delays said interrupt request until a predetermined condition is met, wherein said interrupt request control logic comprises a condition detector that determines when a predetermined condition is met, wherein said condition detector monitors data being transferred between said data source and said memory, wherein said DMA controller provides a DMA acknowledgement in response to a DMA request for DMA data transfer, wherein said interrupt request control logic is supplied with said DMA request and DMA acknowledgement, and wherein said interrupt request control logic includes logic for determining a time interval after asserting said DMA acknowledgement, and for generating said interrupt request when said data has been transferred for said time interval equal to a second preset value.

9. An interrupt-driven system for DMA data transfer between a data source and a memory comprising:
- an input/output (I/O) controller responsive to said data source for interfacing said data source to said memory,
- a DMA controller responsive to said I/O controller for handling data transfer between said data source and said memory, and
- an interrupt request control logic responsive to said I/O controller for generating an interrupt request to interrupt a central processing unit (CPU) upon completion of a data transfer operation,
- wherein said interrupt request control logic delays said interrupt request until a predetermined condition is met,
- wherein said interrupt request control logic comprises a condition detector that determines when a predetermined condition is met,
- wherein said condition detector monitors data being transferred between said data source and said memory,
- wherein said DMA controller provides a DMA acknowledgement in response to a DMA request for DMA data transfer,
- wherein said interrupt request control logic is supplied with said DMA request and DMA acknowledgement, and
- wherein said interrupt request control logic includes logic for determining a time interval after asserting said DMA request and for generating said interrupt request when no new DMA request occurs after the assertion of said DMA request for said time interval equal to a third preset value.

10. In an input/output (I/O) system for data transfer between a memory and an I/O device, a method of direct memory access (DMA) data transfer comprising the steps of:
- performing a DMA data transfer operation between said memory and said I/O device,
- supplying an input request signal upon completion of the DMA data transfer operation, and
- generating an interrupt request signal to a CPU after the receipt of the input request signal by an interrupt request logic only when a predetermined condition is met.

11. The method of claim 10, further comprising monitoring data transferred between said memory and said I/O device by said interrupt request logic.

12. The method of claim 11, further comprising monitoring status information indicating status of said data by said interrupt request logic.

13. The method of claim 12, further comprising supplying said interrupt request logic with an input data DMA request to request DMA transfer of said data.

14. The method of claim 13, further comprising supplying said interrupt request logic with a status DMA request to request DMA transfer of said status information.

15. The method of claim 14, further comprising supplying said interrupt request logic with an input data DMA acknowledgement formed to acknowledge said input data DMA request.

16. The method of claim 15, further comprising supplying said interrupt request logic with a status DMA acknowledgement formed to acknowledge said status DMA request.

17. In an input/output (I/O) system for data transfer between a memory and an I/O device, a method of direct memory access (DMA) data transfer comprising the steps of:
- performing a DMA data transfer operation between said memory and said I/O device,
- supplying an input request signal upon completion of the DMA data transfer operation, and
- generating an interrupt request signal to a CPU after the receipt of the input request signal by an interrupt request logic only when a predetermined condition is met, further comprising:
  - monitoring data transferred between said memory and said I/O device by said interrupt request logic, further comprising:
    - monitoring status information indicating status of said data by said interrupt request logic, further comprising:
      - supplying said interrupt request logic with an incut data DMA request to request DMA transfer of said data, further comprising:
        - supplying said interrupt request logic with a status DMA request to request DMA transfer of said status information, and
- wherein said step of generating includes generating said interrupt request when no previous input data and status DMA requests have occurred for a first predetermined time interval.

18. The method of claim 15, wherein said step of generating includes generating said interrupt request when a predetermined number of said input data DMA acknowledgements are supplied.

19. In an input/output (I/O) system for data transfer between a memory and an I/O device, a method of direct memory access (DMA) data transfer comprising the steps of:
- performing a DMA data transfer operation between said memory and said I/O device,
- supplying an input request signal upon completion of the DMA data transfer operation, and
- generating an interrupt request signal to a CPU after the receipt of the input request signal by an interrupt request logic only when a predetermined condition is met, further comprising:
  - monitoring data transferred between said memory and said I/O device by said interrupt request logic, and
- wherein said step of generating includes generating said interrupt request when said data has been transferred for a second predetermined time interval.

20. In an input/output (I/O) system for data transfer between a memory and an I/O device, a method of direct memory access (DMA) data transfer comprising the steps of:
- performing a DMA data transfer operation between said memory and said I/O device,
- supplying an input request signal upon completion of the DMA data transfer operation, and
- generating an interrupt request signal to a CPU after the receipt of the input request signal by an interrupt request logic only when a predetermined condition is met, further comprising:
  - monitoring data transferred between said memory and said I/O device by said interrupt request logic, further comprising:

monitoring status information indicating status of said data by said interrupt request logic. further comprising:

supplying said interrupt request logic with an input data DMA request to request DMA transfer of said data, and wherein said step of generating includes generating said interrupt request when no new DMA request occurs for a third predetermined time period following assertion of said input data DMA request.

21. In an input/output (I/O) system for data transfer between a memory and an I/O device, a method of direct memory access (DMA) data transfer comprising the steps of:

performing a DMA data transfer operation between said memory and said I/O device, supplying an input request signal upon completion of the DMA data transfer operation, and generating an interrupt request signal to a CPU after the receipt of the input request signal by an interrupt request logic only when a predetermined condition is met, further comprising:

monitoring data transferred between said memory and said I/O device by said interrupt request logic, further comprising:

monitoring status information indicating status of said data by said interrupt request logic, further comprising:

supplying said interrupt request logic with an input data DMA request to request DMA transfer of said data, further comprising:

supplying said interrupt request logic with a status DMA request to request DMA transfer of said status information, and wherein said step of generating includes generating said interrupt request when no new DNA request occurs for a fourth predetermined time period following assertion of said status DMA request.

22. The method of claim 12, wherein said step of generating includes generating said interrupt request when said data and said status information indicate an error.

* * * * *